July 18, 1944.  G. F. PEMBROKE  2,354,053
APPARATUS FOR TESTING OR MEASURING SIZES OR DIMENSIONS
Filed June 4, 1943   2 Sheets-Sheet 1

Inventor
GEORGE F. PEMBROKE

By Watson, Cole, Grindle and Watson
Attorneys

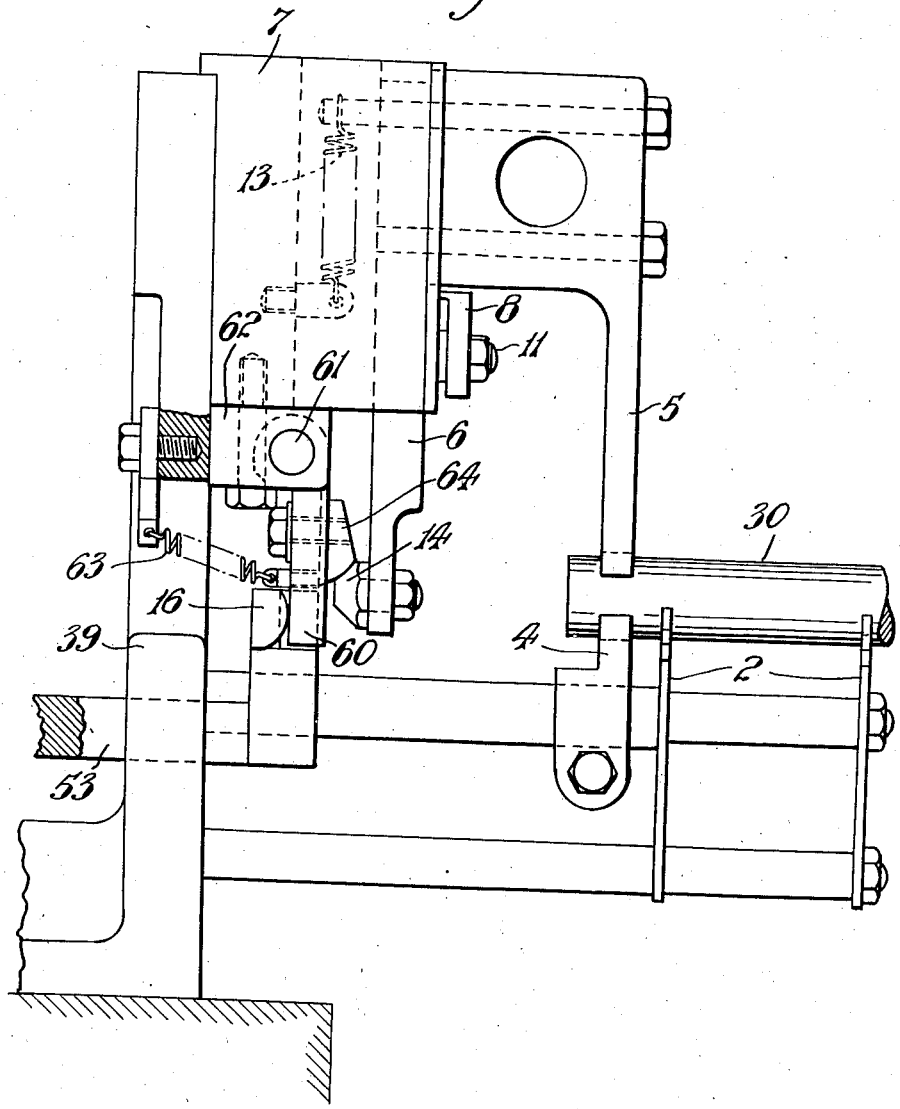

Patented July 18, 1944

2,354,053

UNITED STATES PATENT OFFICE 2,354,053

APPARATUS FOR TESTING OR MEASURING SIZES OR DIMENSIONS

George Frederick Pembroke, Deptford, London, England

Application June 4, 1943, Serial No. 489,666
In Great Britain June 5, 1942

1 Claim. (Cl. 33—147)

This invention concerns improvements in or relating to apparatus for testing or measuring sizes or dimensions, in which the movements of a feeler engaging a workpiece are imparted to a measurement transmitter, movable in a path transverse to that of the feeler, by means of co-operating abutments on the feeler and transmitter so that the movement of the feeler abutment determines the extent of movement of the transmitter abutment. An example of this kind of apparatus is described in the co-pending United States application Serial No. 436,370.

It is found in practice with the construction shown in said specification that wear or any slackness in the guides of the slidable bar or measurement transmitter which supports the magnet causes inaccuracies in the results obtained from a test.

According to the present invention there is provided measuring apparatus comprising in combination a reciprocable feeler-member, a measurement transmitter-member, reciprocable in a fixed path transverse to that of said feeler, and an intermediate member independently mounted and disposed between, and adapted to co-operate with, the reciprocable feeler and the measurement transmitter, an abutment on the intermediate member, and a further abutment movable with one of the other said members, each of the abutments having a portion inclined to the direction of movement of both the feeler and the transmitter, the abutments being caused to engage at their inclined surfaces which are so arranged that movement of the feeler-member determines the extent of movement of the transmitter-member. The intermediate member may be pivoted to a fixed part of the apparatus so that it can follow the straight line movements of the transmitter-member, with a swinging movement and in this case one of the inter-engaging surfaces of the two parts may be of convex arcuate form to compensate for the swinging movement.

Apparatus made in accordance with the invention will now be described with reference to the accompanying drawings which show apparatus for measuring the diameter of cylindrical objects.

In the drawings:

Figure 2 is a side elevation of Figure 1.

Figure 1:
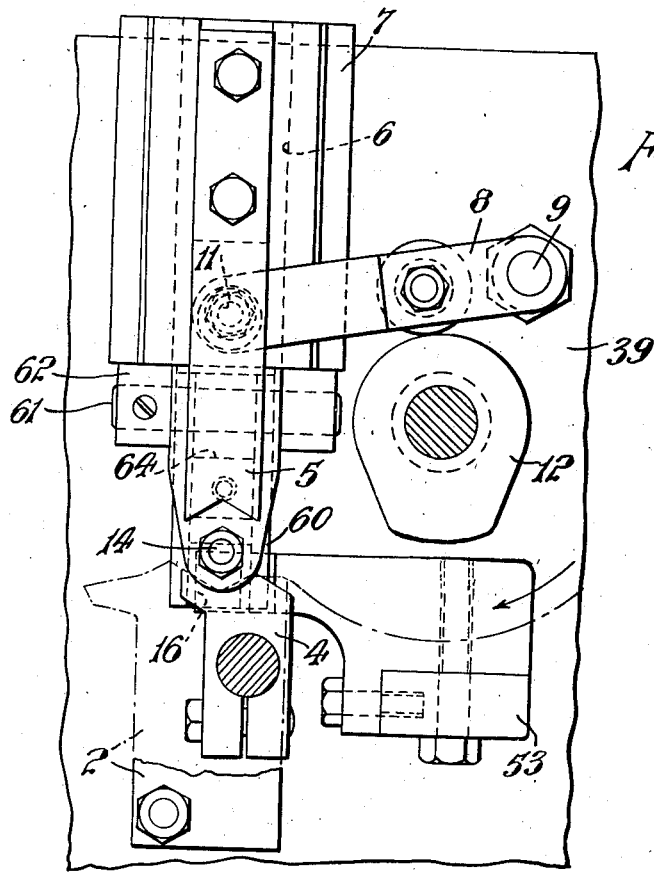
Figure 1 is a front elevation of the measuring apparatus.
Figure 3:
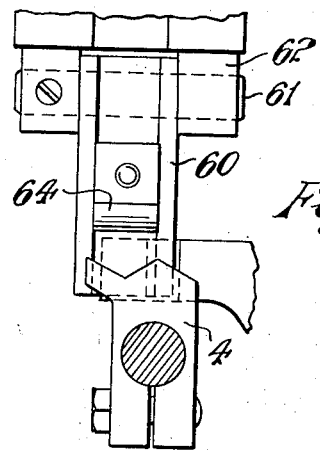
Figure 3 is a fragmentary view of Figure 1, certain parts being broken away to expose parts hidden in that figure.

Referring to the drawings: cylindrical objects 30 are fed in succession on to two V shaped supports 2. In Figure 1 these supports are broken away to expose other parts, but the outline is shown in chain lines. The objects are fed to the V shaped supports for gauging in any convenient manner, and pass for example over a curved track shown by chain lines in Figure 1. Mechanism for effecting this feeding movement forms no part of the present invention, but it may be similar to that described in the co-pending United States application Serial No. 434,127.

As the objects are moved towards and on to the V shaped supports, the ends of the objects are engaged by suitable side guides, not shown, so as to locate the object in the correct position if the diameter is to be measured at any particular part of the length.

When the object has been positioned on the V shaped supports the object is also in engagement with an anvil 4 which is shaped to receive the object. As shown, the anvil 4 is also of V shape, but it may be of concave arcuate shape or any other shape to suit the contour of an object being measured. Above the anvil there is provided a co-operating member or feeler 5 fixed to a slidable bar 6 which is vertically reciprocable in a guide 7. The movement of the feeler is effected by means of a lever 8 pivoted on a stud 9 fixed to the frame 39 and connected to the bar 6 by a pin 11. A cam 12 raises the lever and the feeler 5 is pulled down on to the object by a spring 13. At the lower end of the bar 6 there is secured an abutment 14 which is of a conical shape for a purpose described below.

Measurements effected by the feeler 5 are transmitted therefrom to indicator mechanism which may be similar to that referred to in United States application Serial No. 399,561. This indicator mechanism includes a slidable bar 53 which supports a magnet, and also indicator members. The sliding bar in the present instance constitutes a measurement transmitter through which measurements effected by the feeler 5 are transmitted to the indicator mechanism. The end of the sliding bar 53 which is nearest the feeler is provided with a further abutment 16 which is of convex arcuate form, see Figure 2, the convex surface being adapted to engage a flat surface formed on an intermediate member 60. This member is pivoted on a pin 61 mounted in a bearing block 62 and urged by a spring 63 to hold a flat face in engagement with the convex face of the abutment 16. On the opposite side of the intermediate member there is provided an abutment 64 consisting of an adjustable lug having a face of convex arcuate form so disposed that it can engage the surface of the conical abutment 14 when a testing operation is in progress, see Figure 2.

The curvature of the operative face of the abutment 64 is such that it is eccentric with respect to the axis of the pivot pin 61 so that as the measurement transmitter is urged towards the feeler 5 in a testing operation the pressure between the adjustable lug and the conical abutment tends to urge the latter towards the object being tested, i. e. downwards as seen in Figure 2.

When a measuring operation is being effected the bar 53 is moved towards the feeler under the action of a spring, for example as described in the United States application Serial No. 399,561, and the abutment 16 presses against the flat face of the intermediate member 60. If the object 30 is of the correct size the abutments 14 and 64 will engage each other to a predetermined extent. Should, however, the diameter of the object be greater or less than desired, the position of the abutment 14 will vary in the vertical sense, and this will determine the position of the pivoted member 60 relatively to the bar 6, and consequently that of the bar 53.

It will be seen that with the construction described and illustrated the measurement transmitter 53 takes up an exact position as determined by the position of the feeler 5 and any looseness in the guides of the bar 53 does not affect the result of the test.

What I claim as my invention and desire to secure by Letters Patent is:

Measuring apparatus comprising in combination a reciprocable feeler-member, a measurement transmitter-member, reciprocable in a fixed path transverse to that of said feeler, and an intermediate member independently mounted and disposed between, and adapted to co-operate with, the reciprocable feeler and the measurement transmitter, the said intermediate member being mounted on a fixed pivot and arranged to follow the straight line movement of the transmitter-member with a swinging movement, an abutment on the intermediate member, and a further abutment movable with one of the other said members, each of the abutments having a portion inclined to the direction of movement of both the feeler and the transmitter, the abutments being caused to engage at their inclined surfaces which are so arranged that movement of the feeler-member determines the extent of movement of the transmitter-member, and wherein the said surface of one of the said abutments is of convex arcuate form to compensate for the swinging movement.

GEORGE FREDERICK PEMBROKE.